(12) United States Patent
Yang (10) Patent No.: US 12,379,246 B2
(45) Date of Patent: Aug. 5, 2025

(54) DETECTOR OF TERAHERTZ BAND, RECEIVER HAVING THE SAME, AND IMAGING SYSTEM USING THE SAME

(71) Applicant: RESEARCH COOPERATION FOUNDATION OF YEUNGNAM UNIVERSITY, Gyeongsangbuk-do (KR)

(72) Inventor: Jong Ryul Yang, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 398 days.

(21) Appl. No.: 18/125,305

(22) Filed: Mar. 23, 2023

(65) Prior Publication Data
US 2023/0400352 A1     Dec. 14, 2023

(30) Foreign Application Priority Data

Jun. 8, 2022 (KR) ........................ 10-2022-0069649

(51) Int. Cl.
*G01J 1/44*  (2006.01)
*G01N 21/3581* (2014.01)

(52) U.S. Cl.
CPC ............ *G01J 1/44* (2013.01); *G01N 21/3581* (2013.01); *G01J 2001/4446* (2013.01)

(58) Field of Classification Search
CPC ....... G01N 21/3581; G01J 1/44; G01J 5/0837
See application file for complete search history.

(56) References Cited

FOREIGN PATENT DOCUMENTS

| JP | 2011-509518 A | | 3/2011 |
|---|---|---|---|
| JP | 2017058224 A | * | 3/2017 |
| KR | 10-1994-0017159 A | | 7/1994 |
| KR | 10-1197566 B1 | | 11/2012 |
| KR | 10-2014-0026365 A | | 3/2014 |
| KR | 10-1533235 B1 | | 7/2015 |

OTHER PUBLICATIONS

Office action issued on Jun. 26, 2024 from Korean Patent Office in a counterpart Korean Patent Application No. 10-2022-0069649 (all the cited references are listed in this IDS.) (English translation is also submitted herewith.).

Ha-Neul Lee, "A CMOS Plasmon Array Detector IC for Improving the performance of Terahertz Imaging Systems", Graduate School Yeungnam University Department of Electronic Engineering, Master's Degree Paper, 2021 (English Abstract is included in pp. 76-77).

* cited by examiner

*Primary Examiner* — David P Porta
*Assistant Examiner* — Casey Bryant
(74) *Attorney, Agent, or Firm* — The PL Law Group, PLLC (57) ABSTRACT

A receiver according to an embodiment is a terahertz band receiver including an antenna configured to receive a terahertz band signal reflected or transmitted from a measurement target, a detector configured to receive a differential signal including a first input signal $V_{THz}$ and a second input signal $-V_{THz}$ with phase difference of 180° to each other from the antenna to detect a voltage, and operate in a concurrent mode, and a buffer amplifier configured to amplify and output a signal detected by the detector.

19 Claims, 8 Drawing Sheets

DETECTOR OF TERAHERTZ BAND, RECEIVER HAVING THE SAME, AND IMAGING SYSTEM USING THE SAME

PRIORITY

This application claims the benefit under 35 USC § 119 of Korean Patent Application No. 10-2022-0069649 filed on Jun. 8, 2022 in the Korean Intellectual Property Office (KIPO), the entire disclosure of which is incorporated herein by reference for all purposes.

BACKGROUND

1. Field

Embodiments of the present disclosure relate to a receiver of terahertz band.

2. Description of Related Art

Terahertz (THz) waves refer to electromagnetic waves with frequencies in a band ranging from 0.1 THz to 10 THz. Since terahertz waves are lying between radio waves and light waves and have high transmittance and directivity, they are expected to be widely used in security imaging, radio astronomy, and medical imaging. In particular, the terahertz imaging system is capable of non-destructive inspection due to its low ionization energy for frequency, and terahertz waves are attracting attention as a frequency resource to replace millimeter waves as they can be used for communication beyond the limits of short wavelengths.

The performance of a THz imaging system can be expressed as a signal-to-noise ratio (SNR) in which a receiver detects and outputs a signal reflected or transmitted from a measurement target while the measurement target is placed independently between a transmitter and the receiver. The signal-to-noise ratio, which represents an image quality factor, can be calculated as a ratio between an output signal when a transmitted signal is reflected by a metal target and an output signal when the transmitted signal passes through a non-reflective target.

Meanwhile, a receiver with high sensitivity improves the performance of the imaging system, and the sensitivity of the receiver is measured based on voltage responsivity and noise equivalent power. Here, the voltage responsivity represents the magnitude of an output voltage as a function of input signal power, and the noise equivalent power represents noise characteristic of the receiver. Since the voltage responsivity and the noise equivalent power are in inverse proportion, increasing the voltage responsivity reduces the noise equivalent power, thereby enabling high sensitivity characteristics of the receiver to be achieved.

SUMMARY

An embodiment of the present disclosure is to provide a detector of terahertz band capable of realizing high sensitivity, a receiver having the same, and an imaging system using the same.

A receiver according to the disclosed embodiment is a receiver of terahertz band including an antenna configured to receive a terahertz band signal reflected or transmitted from a measurement target, a detector configured to receive differential signals including a first input signal $V_{THz}$ and a second input signal $-V_{THz}$ with phase difference of 180° to each other from the antenna to detect a voltage, and operate in a concurrent mode, and a buffer amplifier configured to amplify and output a signal detected by the detector.

The detector may include a first CMOS of which a gate is connected to a first input terminal to which the first input signal $V_{THz}$ is input, a drain is connected to a first output terminal, and a source is connected to ground, a second CMOS of which a gate is connected to a second input terminal to which a second input signal $-V_{THz}$ is input, a drain is connected to a second output terminal, and a source is connected to ground, a first capacitor provided between the gate of the first CMOS and the second output terminal, and a second capacitor provided between the gate of the second CMOS and the first output terminal.

One end of the first capacitor may be connected to the gate of the first CMOS and the first input terminal, and the other end of the first capacitor may be connected to the drain of the second CMOS and the second output terminal, and one end of the second capacitor may be connected to the gate of the second CMOS and the second input terminal, and the other end of the second capacitor may be connected to the drain of the first CMOS and the first output terminal.

Each of the first CMOS and the second CMOS may have operating speeds slower than frequencies of the first input signal $V_{THz}$ and the second input signal $-V_{THz}$.

In the detector, through the operation in the concurrent mode, an output by gate input and an output by drain input may be combined and appears at the first output terminal and the second output terminal, respectively.

When the first input signal $V_{THz}$ and the second input signal $-V_{THz}$ are respectively input to the gates of the first CMOS and the second CMOS, the output by the gate input may include a first gate output signal which is output from the first output terminal and has a phase difference of 180° from the first input signal $V_{THz}$ and a second gate output signal which is output from the second output terminal and has a phase difference of 180° from the second input signal $-V_{THz}$.

When the first input signal $V_{THz}$ and the second input signal $-V_{THz}$ are respectively input to the gates of the first CMOS and the second CMOS, the output by the drain input may include a second drain output signal which is output from the first output terminal through the second capacitor and has the same phase as the second input signal $-V_{THz}$, and a first drain output signal which is output from the second output terminal through the first capacitor and has the same phase as the first input signal $V_{THz}$.

The first gate output signal and the second drain output signal may be combined and output at the first output terminal, and the second gate output signal and the first drain output signal may be combined and output at the second output terminal.

The buffer amplifier may include a signal combiner configured to combine signals output from the first output terminal and the second output terminal of the detector, a first amplifier configured to firstly amplify a magnitude of the signal combined by the signal combiner, a second amplifier connected to the first amplifier and configured to secondarily amplify the signal firstly amplified by the first amplifier, and a voltage buffer connected between the second amplifier and an output terminal of the buffer amplifier and configured to maintain an output voltage of the buffer amplifier constant.

The signal combiner may include a first transistor and a second transistor, a gate of the first transistor may be connected to the first output terminal and a gate of the second transistor may be connected to the second output terminal, and sources of the first transistor and the second transistor may be respectively connected to ground, and a drain of the first transistor and a drain of the second transistor may be connected to each other to configure a first node.

The signal combiner, at the first node, may combine signals that are respectively output from the first output terminal and the second output terminal of the detector, and may cancel and remove the differential signals input to the signal combiner without passing through the detector.

The first amplifier may include a third transistor and a fourth transistor connected in series between a power supply voltage of the receiver and the signal combiner, a source of the third transistor may be connected to the power supply voltage, and a source of the fourth transistor may be connected to the first node, and a drain of the third transistor and a drain of the fourth transistor may be connected to each other to configure a second node, and a predetermined bias voltage may be applied to a gate of the third transistor and a gate of the fourth transistor.

The second amplifier may include an isolation amplifier connected to the first amplifier and provided to block external noise while secondarily amplifying the firstly amplified signal, and a current supplier including a fifth transistor provided between the power supply voltage and the isolation amplifier and configured to supply a current to the isolation amplifier.

The isolation amplifier may include sixth to ninth transistors, the sixth transistor and the eighth transistor may be connected in series between the current supplier and ground, the seventh transistor and the ninth transistor may be connected in series between the current supplier and ground, and the sixth transistor and the eighth transistor may be connected in parallel with the seventh transistor and the ninth transistor.

A gate of the sixth transistor may be connected to the second node, a drain of the sixth transistor and a drain of the eighth transistor may be connected to each other, and a source of the sixth transistor and a source of the seventh transistor may be connected to each other and may also be connected to the drain of the fifth transistor, a drain of the seventh transistor and a drain of the ninth transistor may be connected to each other to configure a third node, and a gate of the eighth transistor and a gate of the ninth transistor may be connected to each other and a source of the eighth transistor and a source of the ninth transistor may be respectively connected to ground, and a gate of the eighth transistor may be connected to the drain of the sixth transistor and the drain of the eighth transistor.

A gate of the seventh transistor may be connected to the output terminal of the buffer amplifier, the voltage buffer may include a tenth transistor and an eleventh transistor connected in series between the power supply voltage and ground, a gate of the tenth transistor may be connected to the third node, and a drain of the tenth transistor may be connected to the power supply voltage, a source of the tenth transistor may be connected to the output terminal of the buffer amplifier, a drain of the eleventh transistor may be connected to a source of the tenth transistor, and a source of the eleventh transistor may be connected to ground, and a preset bias voltage may be applied to a gate of the eleventh transistor.

An imaging system of terahertz band according to the disclosed embodiment includes a transmitter configured to transmit a terahertz band signal to a measurement target, and a receiver configured to receive a signal reflected or transmitted from the measurement target, and the receiver includes an antenna configured to receive the terahertz band signal reflected or transmitted from the measurement target, a detector configured to receive a differential signal including a first input signal $V_{THz}$ and a second input signal $-V_{THz}$ with phase difference of 180° to each other from the antenna to detect a voltage, and operate in a concurrent mode, and a buffer amplifier configured to amplify and output a signal detected by the detector.

A detector according to the disclosed embodiment is a detector mounted on a receiver of the terahertz band, and the detector is configured to receive differential signals including a first input signal and a second input signal with phase difference of 180° to each other from an antenna that receives a terahertz band signal, detect a voltage, and operate in a concurrent mode.

The detector may include a first CMOS of which a gate is connected to a first input terminal to which the first input signal $V_{THz}$ is input, a drain is connected to a first output terminal, and a source is connected to ground, a second CMOS of which a gate is connected to a second input terminal to which a second input signal $-V_{THz}$ is input, a drain is connected to a second output terminal, and a source is connected to ground, a first capacitor provided between the gate of the first CMOS and the second output terminal, and a second capacitor provided between the gate of the second CMOS and the first output terminal.

According to the disclosed embodiment, one end of the first capacitor is connected to the gate of the first CMOS, the other end of the first capacitor is connected to the drain of the second CMOS, one end of the second capacitor is connected to the gate of the second CMOS, and the other end of the second capacitor is connected to the drain of this first CMOS, so that when input signals $V_{THz}$, and $-V_{THz}$ are input to the first CMOS and the second CMOS of the detector, the output by gate input (output by the first mode) and the output by drain input (output by the second mode) are combined and appear at the output terminals $V_{OUTP}$ and $V_{OUTN}$ of the detector, respectively. Therefore, the magnitude of the voltage output from the detector can be raised. As a result, it is possible to implement a receiver with high sensitivity characteristics by increasing the voltage responsivity of the detector and lowering the noise equivalent power.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

Further, terms such as first, second, etc., may be used to describe various components, but the components are not limited by the terms. The above terms may be used for the purpose of distinguishing one component from another. For example, a first component may be termed a second component, and similarly, a second component may be termed a first component, without departing from the scope of the present invention.

Figure 1:
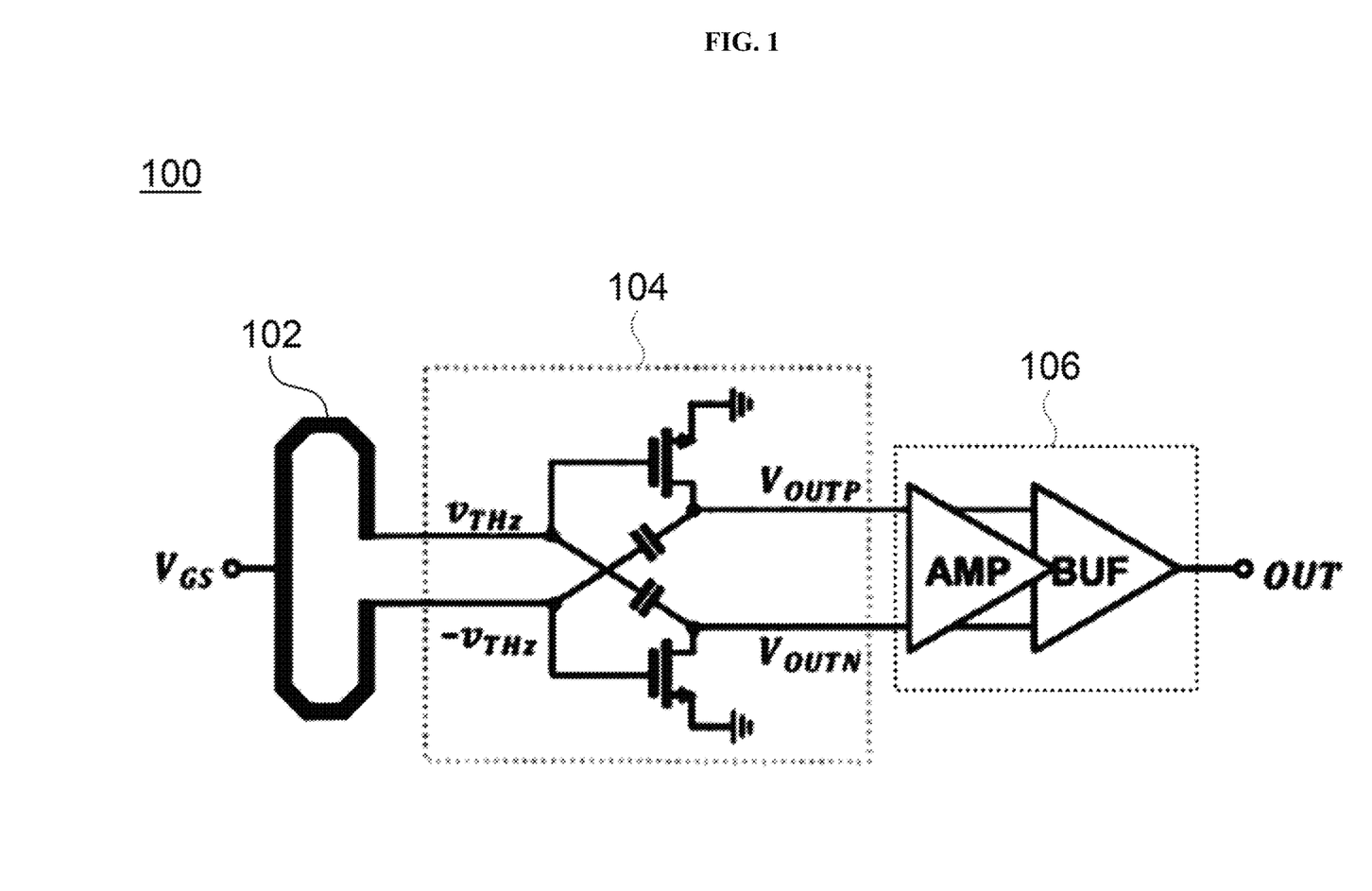
FIG. 1 is a diagram illustrating a receiver of terahertz band according to an embodiment of the present disclosure.

FIG. 1 is a diagram illustrating a receiver of terahertz band according to an embodiment of the present disclosure.

Referring to FIG. 1, a terahertz band receiver 100 may include an antenna 102, a detector 104, and a buffer amplifier 106. Hereinafter, the receiver 100 is described as an example of a receiver of a terahertz imaging system, but the application range of the receiver 100 is not limited thereto. In this specification, terahertz includes not only the band of ranging from 01 THz to 10 THz, but also a sub-terahertz band ranging from tens of GHz to hundreds of GHz.

The antenna 102 can receive a signal reflected or transmitted from a measurement target. In this case, the antenna 102 may be designed to receive a signal of a frequency higher than an operating frequency of the detector 104. For example, antenna 102 may have an operating frequency of 200 GHz. Further, the antenna 102 may be a differential integrated antenna.

In an exemplary embodiment, the antenna 102 may be formed of a folded dipole antenna to assume a mode of operation of the detector 104 by applying a gate bias via a virtual ground. However, a shape and type of the antenna 102 is not limited thereto. The terahertz signal received by the antenna 102 may be input to the detector 104.

The detector 104 may be provided to detect a voltage of a terahertz signal (hereinafter referred to as an input signal) input from the antenna 102. The input signal is a differential signal and may include a first input signal $V_{THz}$ and a second input signal $-V_{THz}$ with phase difference of 180° to each other.

The detector 104 may include a circuitry for concurrent-mode operation. To this end, the detector 104 may include a cross coupled capacitor.

Figure 2:
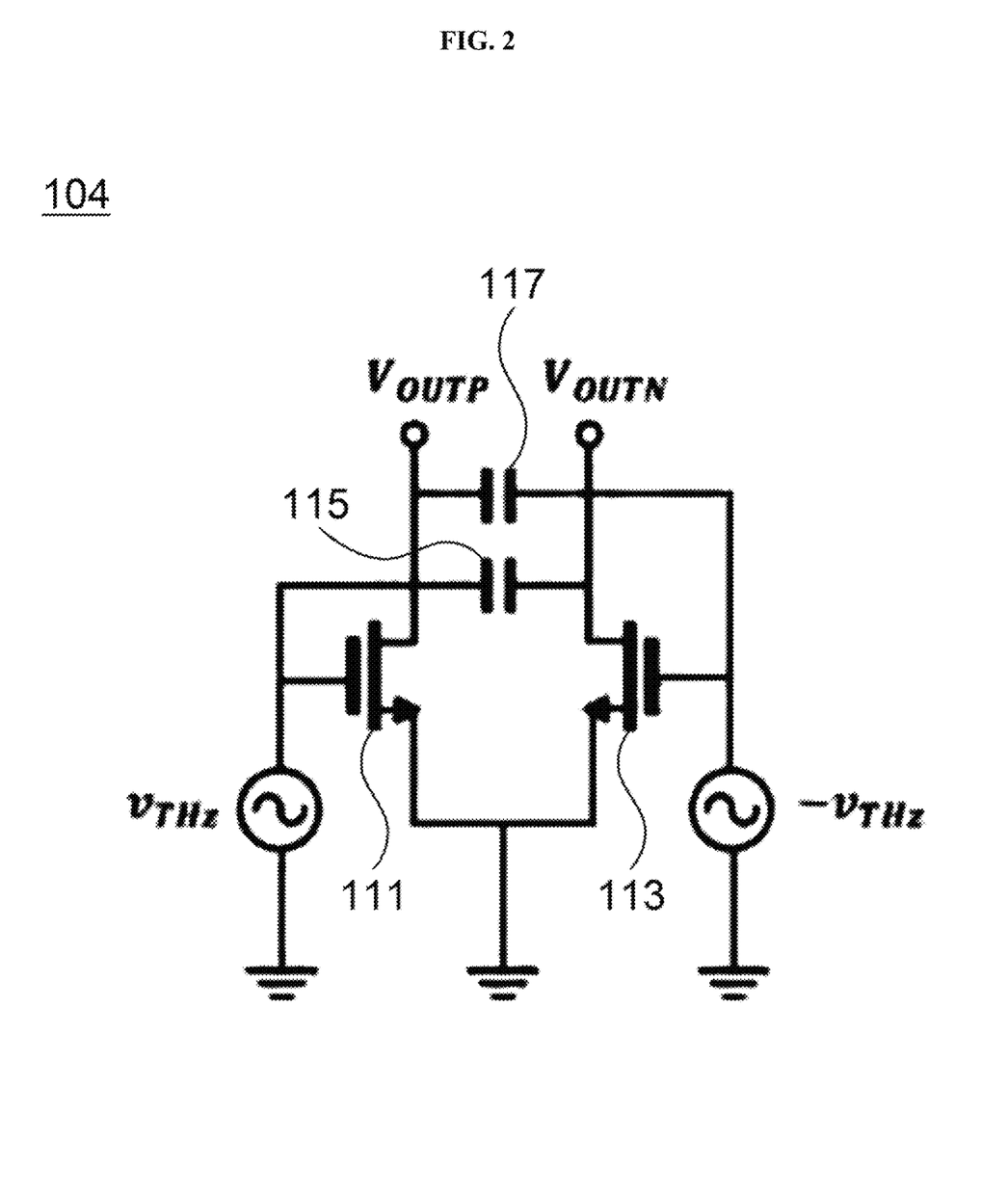
FIG. 2 is a diagram illustrating a circuit of a detector according to an embodiment of the present disclosure.

FIG. 2 is a diagram illustrating a circuit of the detector 104 according to an embodiment of the present invention. Referring to FIG. 2, the detector 104 may include a first complementary metal oxide semiconductor (CMOS) 111, a second CMOS 113, a first capacitor 115, and a second capacitor 117.

A gate of the first CMOS 111 may be connected to a first input terminal A. A drain of the first CMOS 111 may be connected to a first output terminal $V_{OUTP}$. A source of the first CMOS 111 may be connected to ground. A first input signal $V_{THz}$ may be input to the first input terminal A.

A gate of the second CMOS 113 may be connected to a second input terminal B. A drain of the second CMOS 113 may be connected to a second output terminal $V_{OUTN}$. A source of the second CMOS 113 may be connected to ground. A second input signal $-V_{THz}$ may be input to the second input terminal B.

Here, frequencies of the first input signal $V_{THz}$ and the second input signal $-V_{THz}$ may be higher than current gain cut-off frequencies of the first CMOS 111 and the second CMOS 113. That is, the frequencies of the first input signal $V_{THz}$ and the second input signal $-V_{THz}$ may be higher than operating speeds of the first CMOS 111 and the second CMOS 113.

The first capacitor 115 may be provided between the gate of the first CMOS 111 and the second output terminal $V_{OUTN}$. That is, one end of the first capacitor 115 may be electrically connected to the gate of the first CMOS 111 and the first input terminal A. The other end of the first capacitor 115 may be electrically connected to the drain of the second CMOS 113 and the second output terminal $V_{OUTN}$.

The second capacitor 117 may be provided between the gate of the second CMOS 113 and the first output terminal $V_{OUTP}$. That is, one end of the second capacitor 117 may be electrically connected to the gate of the second CMOS 113 and the second input terminal B. The other end of the second capacitor 117 may be electrically connected to the drain of the first CMOS 113 and the first output terminal $V_{OUTP}$.

In this way, the first capacitor 115 and the second capacitor 117 are provided by being cross coupled to each other between the first CMOS 113, the first input terminal (A), and the first output terminal $V_{OUTP}$ and the second CMOS 115, the second input terminal (B), and the second output terminal $V_{OUTN}$, so that the detector 104 can operate in a concurrent mode.

That is, one end of the first capacitor 115 is connected to the gate of the first CMOS 111, the other end of the first capacitor 115 is connected to the drain of the second CMOS 113, one end of the second capacitor 117 is connected to the gate of the second CMOS 113, and the other end of the second capacitor 117 is connected to the drain of the first CMOS 111, so that when the input signals $V_{THz}$, and $-V_{THz}$ are input to the first CMOS 111 and the second CMOS 113, the output by the gate input (output by the first mode) and the output by the drain input (output by the second mode) are combined and appear at the output terminals $V_{OUTP}$ and $V_{OUTN}$, respectively. Therefore, the magnitude of the voltage output from the detector can be raised. This will be described in more detail with reference to FIGS. 3 to 5.

Figure 3:
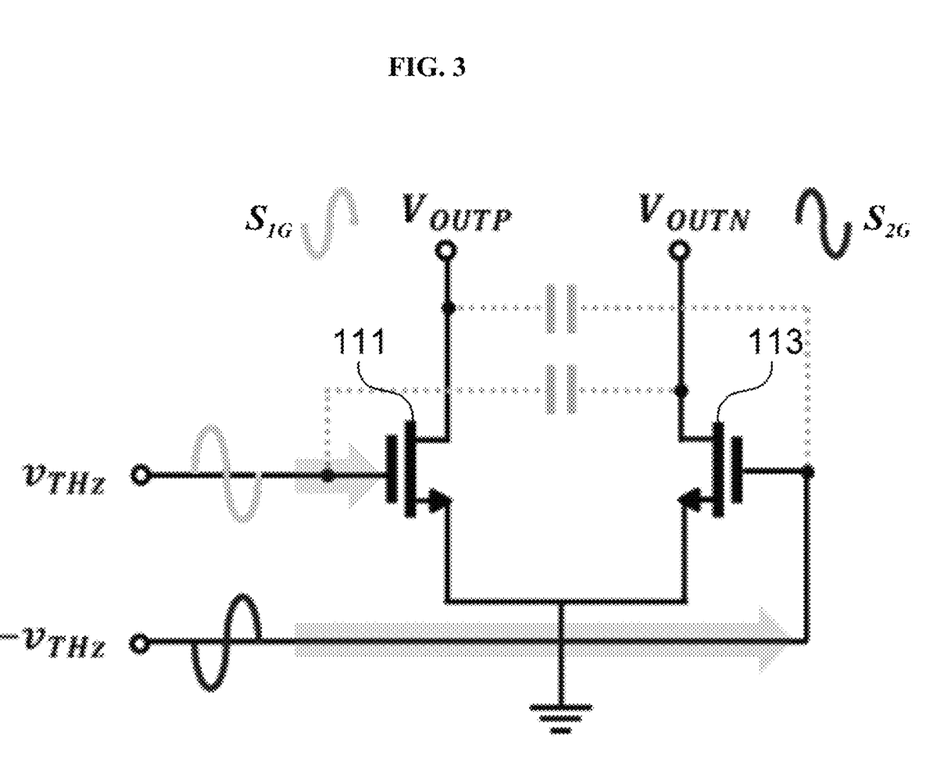
FIG. 3 is a diagram illustrating an output by gate input in the detector according to the embodiment of the present disclosure.

FIG. 3 is a diagram illustrating an output by the gate input in the detector 104 according to an embodiment of the present disclosure. Referring to FIG. 3, when the first input signal $V_{THz}$ and the second input signal $-V_{THz}$ are respectively input to the gates of the first CMOS 111 and the second CMOS 113, a signal $S_{1G}$ (hereinafter, may be referred to as a first gate output signal) having a phase difference of 180° from the first input signal $V_{THz}$ is output from the first output terminal $V_{OUTP}$ connected to the drain of the first CMOS 111. Also, a signal $S_{2G}$ (hereinafter, may be referred to as a second gate output signal) having a phase difference of 180° from the second input signal $-V_{THz}$ is output from the second output terminal $V_{OUTN}$ connected to the drain of the second CMOS 113.

Figure 4:
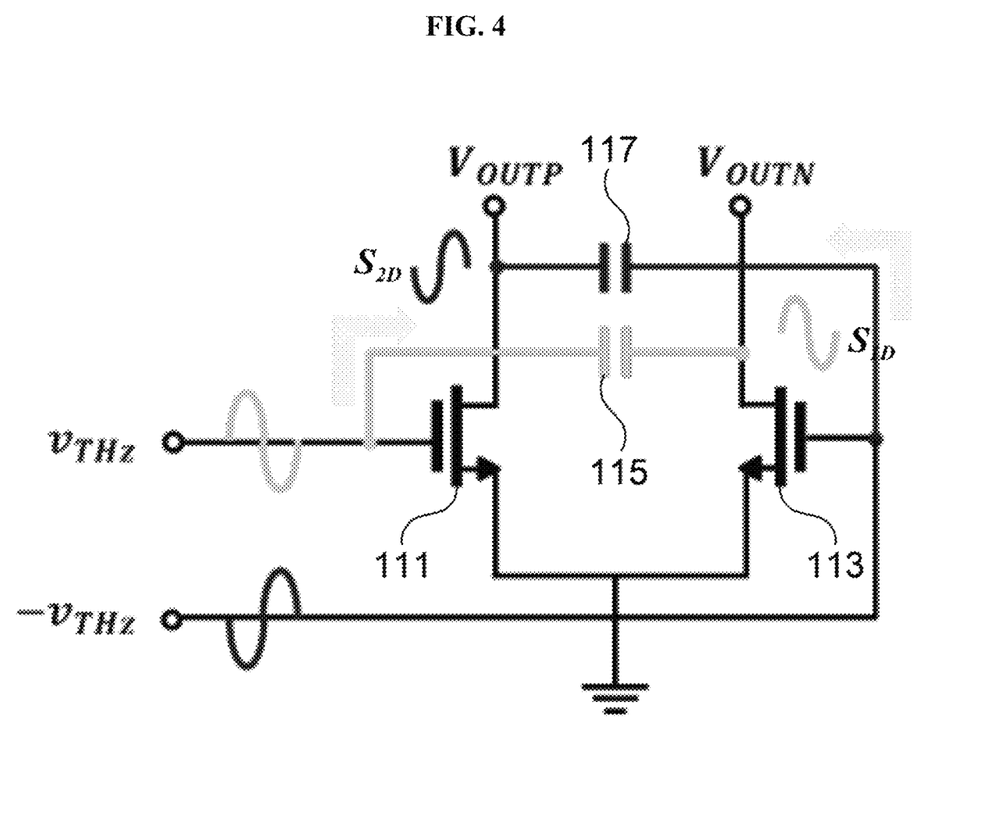
FIG. 4 is a diagram illustrating an output by drain input in the detector according to the embodiment of the present disclosure.

FIG. 4 is a diagram illustrating an output by the drain input in the detector 104 according to the embodiment of the present disclosure. Referring to FIG. 4, when the first input signal $V_{THz}$ and the second input signal $-V_{THz}$ are respectively input to the gates of the first CMOS 111 and the second CMOS 113, a signal $S_{2D}$ (hereinafter, may be referred to as a second drain output signal) having the same phase as the second input signal $-V_{THz}$ is output from the first output terminal $V_{OUTP}$ through the second capacitor 117. Also, a signal $S_{1D}$ (hereinafter, may be referred to as a first drain output signal) having the same phase as the first input signal $V_{THz}$ is output through the first capacitor 115 from the second output terminal $V_{OUTN}$.

Figure 5:
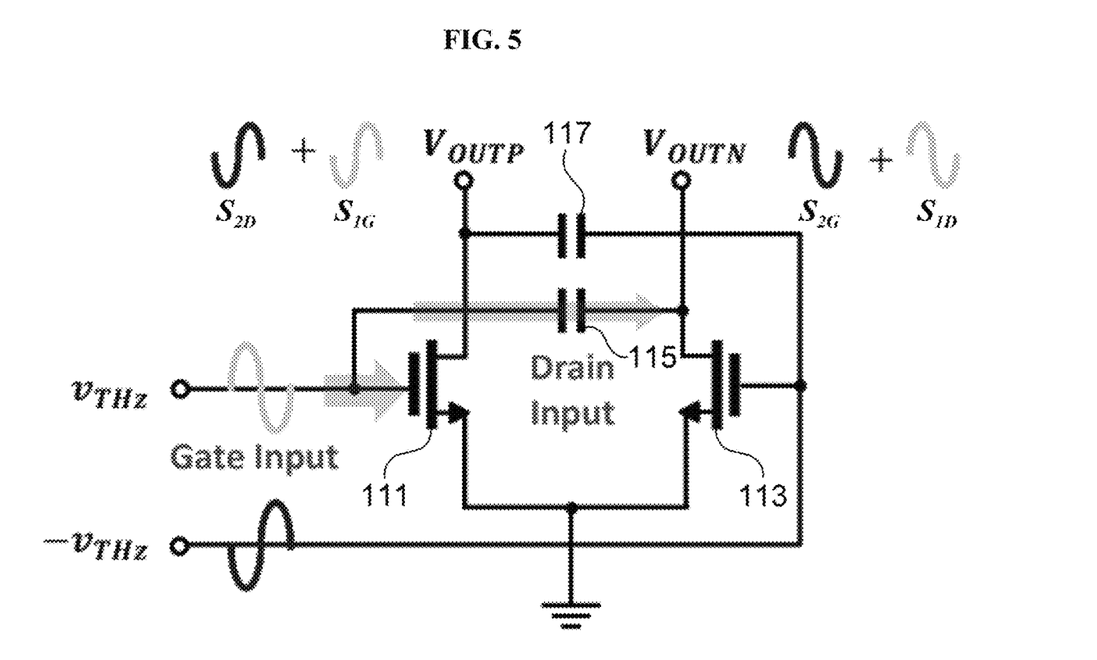
FIG. 5 is a diagram illustrating an output according to a concurrent-mode operation in the detector according to the embodiment of the present disclosure.

FIG. 5 is a diagram illustrating an output according to the concurrent-mode operation in the detector 104 according to the embodiment of the present disclosure. Referring to FIG. 5, when the first input signal $V_{THz}$ and the second input signal $-V_{THz}$ are respectively input to the gates of the first CMOS 111 and the second CMOS 113, the first gate output signal $S_{1G}$ and the second drain output signal $S_{2D}$ are combined at the first output terminal $V_{OUTP}$ and output therefrom. Also, the second gate output signal $S_{2G}$ and the first drain output signal SID are combined at the second output terminal $V_{OUTN}$ and output therefrom.

Here, since the first gate output signal SIG and the second drain output signal $S_{2D}$ are in phase (a phase different from the first input signal $V_{THz}$ by 180°), and the second gate output signal $S_{2G}$ and the first drain output signal SID are in phase (same phase as the first input signal $V_{THz}$), the magnitude of the output voltage when the signals are combined at the first output terminal $V_{OUTP}$ and the second output terminal $V_{OUTN}$ can be increased.

Figure 6:
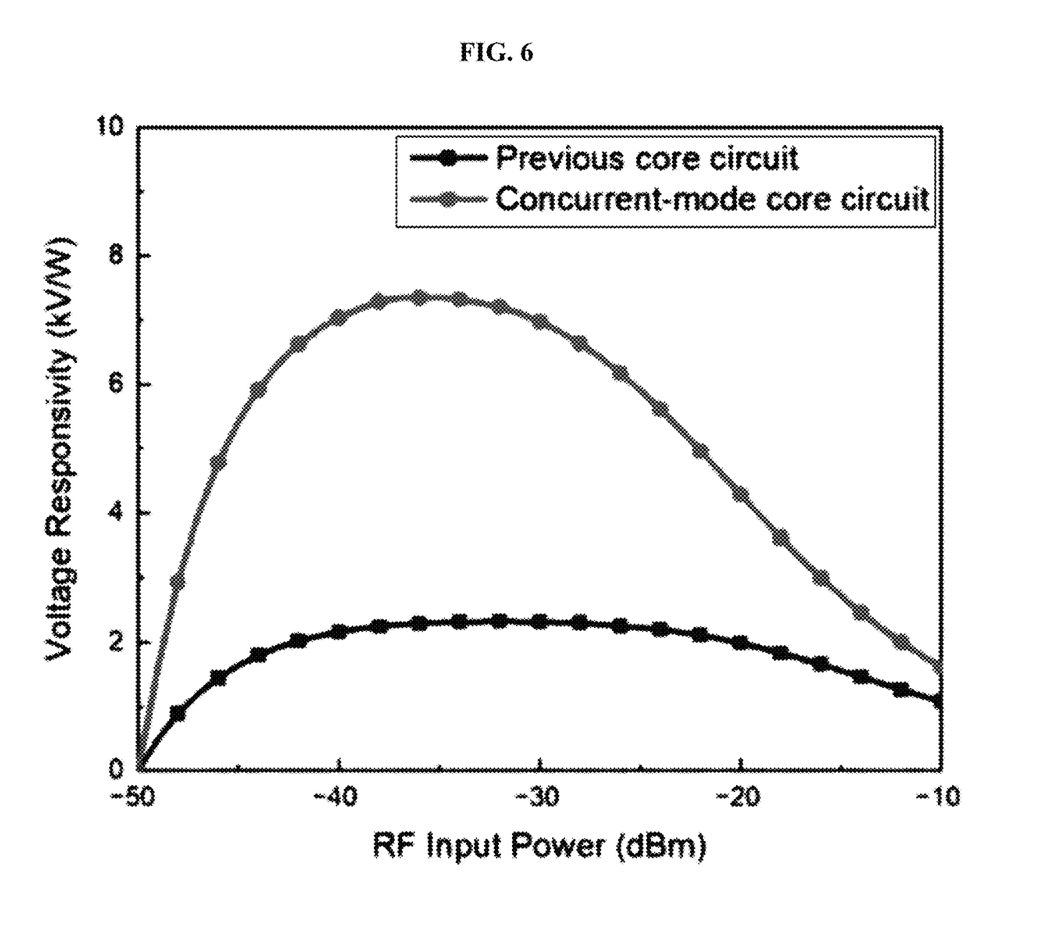
FIG. 6 is a graph in which voltage responsivity according to a detector operating in concurrent mode according to the embodiment of the present disclosure and that of a previous detector are compared.

FIG. 6 is a graph in which the voltage responsivity according to the detector 104 operating in a concurrent mode according to an embodiment of the present disclosure and that of the previous detector are compared. Referring to FIG. 6, it can be seen that the voltage responsivity of the detector 104 operating in the concurrent mode is about 15 to 33 times higher than that of the previous detector.

Figure 7:
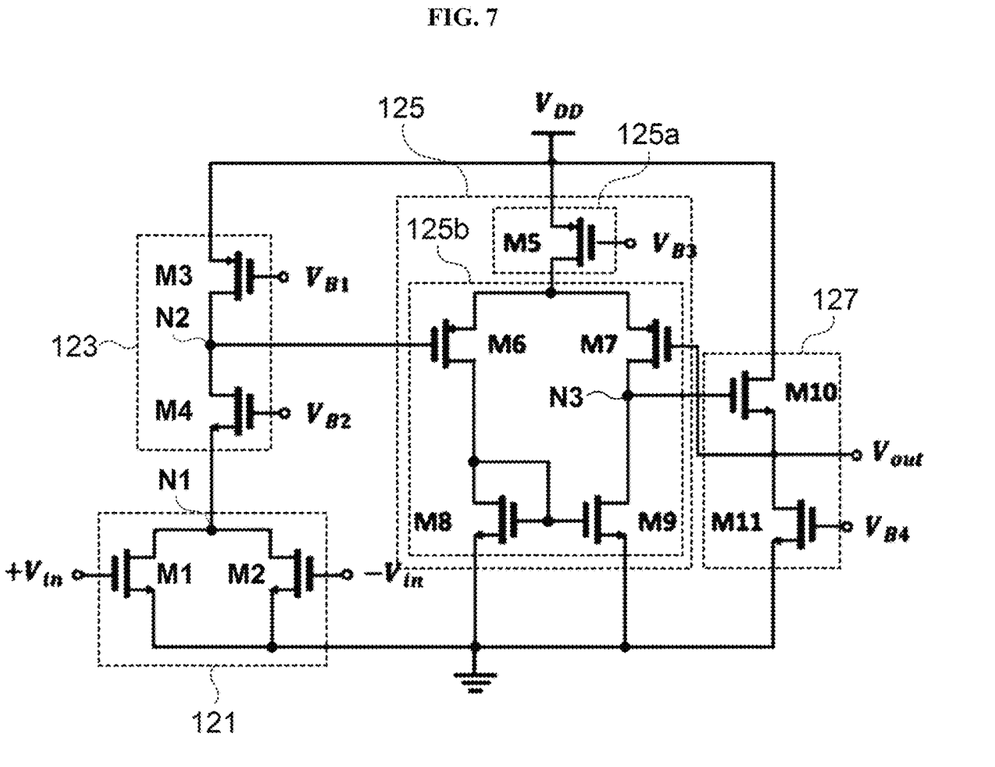
FIG. 7 is a circuit diagram illustrating a configuration of a buffer amplifier according to an embodiment of the present disclosure.

Referring back to FIG. 1, the buffer amplifier 106 may serve amplify and output the signal detected by the detector 104 and block noise introduced from the outside. FIG. 7 is a circuit diagram illustrating a configuration of the buffer amplifier 106 according to an embodiment of the present disclosure. Referring to FIG. 7, the buffer amplifier 106 may include a signal combiner 121, a first amplifier 123, a second amplifier 125, and a voltage buffer 127.

The signal combiner 121 may combine signals output from the first output terminal $V_{OUTP}$ and the second output terminal $V_{OUTN}$ of the detector 104. The signal combiner 121 may include a first transistor M1 and a second transistor M2.

A gate of the first transistor M1 may be connected to the first output terminal $V_{OUTP}$ of the detector 104, and a gate of the second transistor M2 may be connected to the second output terminal $V_{OUTN}$ of the detector 104. Accordingly, the signal output from the first output terminal $V_{OUTP}$ is input to the gate of the first transistor M1, and the signal output from the second output terminal $V_{OUTN}$ is input to the gate of the second transistor M2.

Sources of the first transistor M1 and the second transistor M2 may be respectively connected to ground. Drains of the first transistor M1 and the second transistor M2 may be provided to be connected to each other. In this case, the signals of the first output terminal $V_{OUTP}$ and the second output terminal $V_{OUTN}$ of the detector 104 may be combined at a first node N1 where the drain of the first transistor M1 and the drain of the second transistor M2 are connected. Also, the differential signals $V_{THz}$ and $-V_{THz}$ coming through the detector 104 may be canceled at the first node N1 and removed.

That is, the components input to the gates of the first transistor M1 and the second transistor M2 include DC components and AC components. Here, the DC components are signals detected through the detector 104 and output from the first output terminal and the second output terminal, and are combined at the first node N1. Also, the AC components are the $V_{THz}$ and $-V_{THz}$ input to the detector 104 and are a kind of leakage component directly input to the signal combiner 121 without passing through the detector 104, which are canceled with each other (canceled with each other because they have a phase difference of 180° to each other) at the first node N1 and are removed.

The first amplifier 123 may firstly amplify the magnitude of the signal combined in the signal combiner 121. In an exemplary embodiment, the first amplifier 123 may include a third transistor M3 and a fourth transistor M4. The third transistor M3 and the fourth transistor M4 may be connected in series between a power supply voltage $V_{DD}$ and the signal combiner 121. A source of the third transistor M3 may be connected to the power supply voltage $V_{DD}$, and a source of the fourth transistor M4 may be connected to the first node N1. Also, a drain of the third transistor M3 and a drain of the fourth transistor M4 may be connected to each other.

The second amplifier 125 may be connected to the first amplifier 123 and may secondarily amplify the signal firstly amplified by the first amplifier 123. The second amplifier 125 may serve to block noise introduced from the outside in the process of outputting the secondarily amplified signal to the output terminal $V_{OUT}$ of the buffer amplifier 106. That is, the second amplifier 125 may be a kind of isolation amplifier.

The second amplifier 125 may include a current supplier 125a and an isolation amplifier 125b. The current supplier 125a may include a fifth transistor M5. The fifth transistor M5 may be connected between the power supply voltage $V_{DD}$ and the isolation amplifier 125b. The fifth transistor M5 may serve to supply a current to the isolation amplifier 125b.

The isolation amplifier 125b may be connected to the first amplifier 123. Further, the isolation amplifier 125b may be connected between the current supplier 125a and the ground. The isolation amplifier 125b may include a sixth transistor M6 to a ninth transistor M9.

The sixth transistor M6 and the eighth transistor M8 may be connected in series between the current supplier 125a and the ground. The seventh transistor M7 and the ninth transistor M9 may be connected in series between the current supplier 125a and the ground. The sixth transistor M6 and the eighth transistor M8 may be connected in parallel with the seventh transistor M7 and the ninth transistor M9.

A gate of the sixth transistor M6 may be connected to a second node N2 to which the drain of the third transistor M3 and the drain of the fourth transistor M4 are connected. Here, the signal firstly amplified by the first amplifier 123 is input to the sixth transistor M6. A drain of the sixth transistor M6 and a drain of the eighth transistor M8 may be connected to each other.

A source of the sixth transistor M6 and a source of the seventh transistor M7 may be connected to each other, and also connected to the drain of the fifth transistor M5. A gate of the seventh transistor M7 may be connected to an output terminal $V_{OUT}$. A drain of the seventh transistor M7 and a drain of the ninth transistor M9 may be connected to each other.

A gate of the eighth transistor M8 and a gate of the ninth transistor M9 may be connected to each other. A source of the eighth transistor M8 and a source of the ninth transistor M9 may be connected to ground, respectively. Also, the gate of the eighth transistor M8 may be connected to the drains of the sixth transistor M6 and the eighth transistor M8. In this case, the eighth transistor M8 and the ninth transistor M9 serve as a current mirror.

That is, since the gate of the eighth transistor M8 is connected to the drains of the sixth transistor M6 and the eighth transistor M8, the gate voltage and drain voltage of the eighth transistor M8 become the same. Since the gate of the eighth transistor M8 and the gate of the ninth transistor M9 are connected to each other, the gate voltage of the eighth transistor M8 and the gate voltage of the ninth transistor M9 become the same. Through this, the current flowing through the sixth transistor M6 and the eighth transistor M8 and the current flowing through the seventh transistor M7 and the ninth transistor M9 can be equalized (within an error range).

The voltage buffer 127 may be connected between the second amplifier 125 and the output terminal $V_{OUT}$ of the buffer amplifier 106. The voltage buffer 127 may serve to maintain the voltage output from the buffer amplifier 106 (i.e., the voltage of the output terminal $V_{OUT}$) constant. In an exemplary embodiment, the voltage buffer 127 may be implemented as a source follower. The voltage buffer 127 may include a tenth transistor M10 and an eleventh transistor M11.

The tenth transistor M10 and the eleventh transistor M11 may be connected in series between the power supply voltage $V_{DD}$ and the ground. A gate of the tenth transistor M10 may be connected to a third node N3 to which the drain of the seventh transistor M7 and the drain of the ninth transistor M9 are connected. A drain of the tenth transistor M10 may be connected to the power supply voltage $V_{DD}$, and a source of the tenth transistor M10 may be connected to an output terminal $V_{OUT}$.

A drain of the eleventh transistor M11 may be connected to the source of the tenth transistor M10, and a source of the eleventh transistor M11 may be connected to ground. The eleventh transistor M11 may serve to supply a current to the tenth transistor M10.

Here, the gate of the seventh transistor M7 is connected to the output terminal $V_{OUT}$, the drain of the seventh transistor M7 is connected to the gate of the tenth transistor M10, and the source of the tenth transistor M10 is connected to the output terminal $V_{OUT}$ to form a feedback loop.

In this case, when the voltage of the output terminal $V_{OUT}$ increases, the current flowing into the seventh transistor M7 increases, and thus the voltage input to the tenth transistor M10 decreases and the voltage of the output terminal $V_{OUT}$ decreases. In contrast, when the voltage of the output terminal $V_{OUT}$ decreases, the current flowing into the seventh transistor M7 decreases, t and thus the voltage input to the tenth transistor M10 increases and the voltage of the output terminal $V_{OUT}$ increases.

That is, when the voltage of the output terminal $V_{OUT}$ increases, the voltage of the output terminal $V_{OUT}$ decreases through the feedback loop of the seventh transistor M7 and the tenth transistor M10, and when the voltage of the output terminal $V_{OUT}$ decreases, the voltage of the output terminal $V_{OUT}$ increases through the feedback loop of the seventh transistor M7 and the tenth transistor M10.

In this way, since the voltage of the output terminal $V_{OUT}$ is maintained at a constant voltage through the feedback loop of the seventh transistor M7 and the tenth transistor M10, even if the voltage of the output terminal $V_{OUT}$ changes momentarily due to the inflow of external noise through the output terminal $V_{OUT}$, it is possible to block the voltage change caused by external noise and maintain a constant voltage.

Meanwhile, first to fourth bias voltages $V_{B1}$ to $V_{B4}$ may be respectively applied to the gates of the third transistor M3, the fourth transistor M4, the fifth transistor M5, and the eleventh transistor M11.

Figure 8:
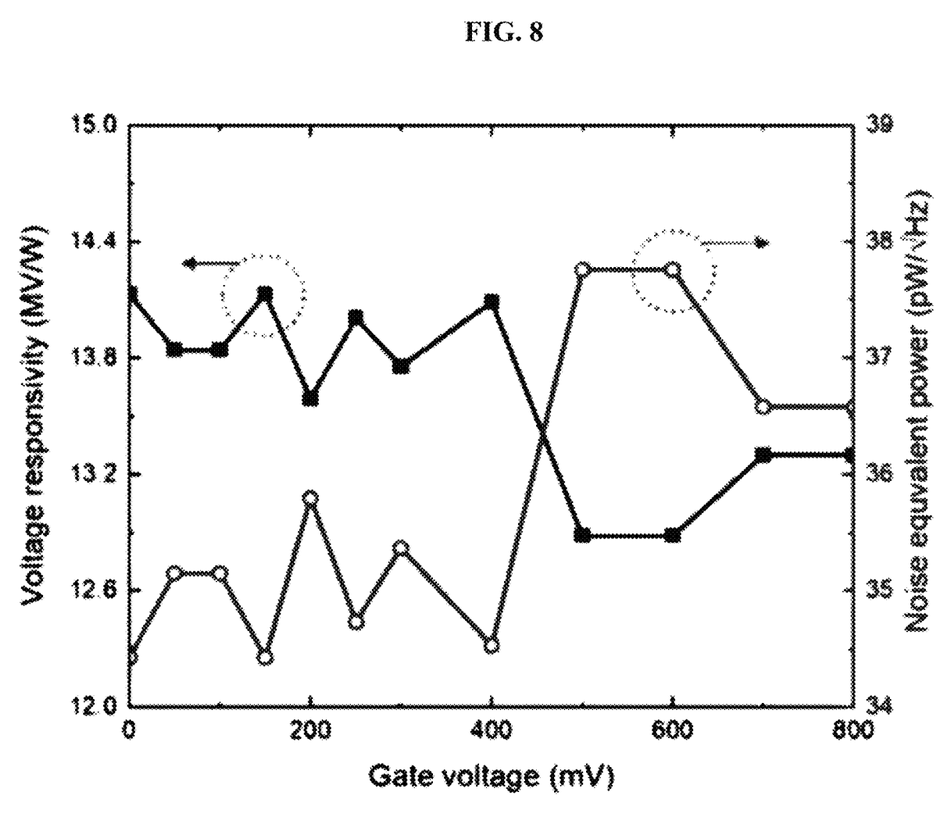
FIG. 8 is a graph illustrating voltage responsivity ($R_V$) and noise equivalent power (NEP) measured in the detector according to the embodiment of the present disclosure.

FIG. 8 is a graph illustrating voltage responsivity ($R_V$) and noise equivalent power (NEP) measured in the detector according to the embodiment of the present disclosure.

Referring to FIG. 8, it can be seen that the voltage responsivity ($R_V$) and noise equivalent power (NEP) measured by the detector 104 are 1413 MV/W and 3442 pW/√Hz, respectively, under the gate bias condition of 150 mV. That is, it can be seen that the voltage responsivity ($R_V$) measured by the detector 104 is high and the noise equivalent power (NEP) is low.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A receiver of terahertz band, comprising:
   an antenna configured to receive a terahertz band signal reflected or transmitted from a measurement target;
   a detector configured to receive differential signals including a first input signal $V_{THz}$ and a second input signal $-V_{THz}$ with phase difference of 180° to each other from the antenna to detect a voltage, and operate in a concurrent mode; and
   a buffer amplifier configured to amplify and output a signal detected by the detector.

2. The receiver of claim 1, wherein the detector comprises:
   a first CMOS of which a gate is connected to a first input terminal to which the first input signal $V_{THz}$ is input, a drain is connected to a first output terminal, and a source is connected to ground;
   is a second CMOS of which a gate is connected to a second input terminal to which a second input signal $-V_{THz}$ is input, a drain is connected to a second output terminal, and a source is connected to ground;
   a first capacitor provided between the gate of the first CMOS and the second output terminal; and
   a second capacitor provided between the gate of the second CMOS and the first output terminal.

3. The receiver of claim 2, wherein one end of the first capacitor is connected to the gate of the first CMOS and the first input terminal;
the other end of the first capacitor is connected to the drain of the second CMOS and the second output terminal;
one end of the second capacitor is connected to the gate of the second CMOS and the second input terminal; and
the other end of the second capacitor is connected to the drain of the first CMOS and the first output terminal.

4. The receiver of claim 3, wherein each of the first CMOS and the second CMOS has operating speeds slower than frequencies of the first input signal $V_{THz}$ and the second input signal $-V_{THz}$.

5. The receiver of claim 3, wherein in the detector, through the operation in the concurrent mode, an output by gate input and an output by drain input is combined and appears at the first output terminal and the second output terminal, respectively.

6. The receiver of claim 5, wherein, when the first input signal $V_{THz}$ and the second input signal $-V_{THz}$ are respectively input to the gates of the first CMOS and the second CMOS, the output by the gate input comprises:
a first gate output signal which is output from the first output terminal and has a phase difference of 180° from the first input signal $V_{THz}$; and
a second gate output signal which is output from the second output terminal and has a phase difference of 180° from the second input signal $-V_{THz}$.

7. The receiver of claim 6, wherein, when the first input signal $V_{THz}$ and the second input signal $-V_{THz}$ are respectively input to the gates of the first CMOS and the second CMOS, the output by the drain input comprises:
a second drain output signal which is output from the first output terminal through the second capacitor and has the same phase as the second input signal $-V_{THz}$; and
a first drain output signal which is output from the second output terminal through the first capacitor and has the same phase as the first input signal $V_{THz}$.

8. The receiver of claim 7, wherein the first gate output signal and the second drain output signal are combined and output at the first output terminal; and
the second gate output signal and the first drain output signal are combined and output at the second output terminal.

9. The receiver of claim 3, wherein the buffer amplifier comprises:
a signal combiner configured to combine signals output from the first output terminal and the second output terminal of the detector;
a first amplifier configured to firstly amplify a magnitude of the signal combined by the signal combiner;
a second amplifier connected to the first amplifier and configured to secondarily amplify the signal firstly amplified by the first amplifier; and
a voltage buffer connected between the second amplifier and an output terminal of the buffer amplifier and configured to maintain an output voltage of the buffer amplifier constant.

10. The receiver of claim 9, wherein the signal combiner includes a first transistor and a second transistor;
a gate of the first transistor is connected to the first output terminal and a gate of the second transistor is connected to the second output terminal;
sources of the first transistor and the second transistor are respectively connected to ground; and
a drain of the first transistor and a drain of the second transistor are connected to each other to configure a first node.

11. The receiver of claim 10, wherein the signal combiner, at the first node, combines signals that are respectively output from the first output terminal and the second output terminal of the detector and cancels and removes the differential signals input to the signal combiner without passing through the detector.

12. The receiver of claim 10, wherein the first amplifier includes a third transistor and a fourth transistor connected in series between a power supply voltage of the receiver and the signal combiner;
a source of the third transistor is connected to the power supply voltage, and a source of the fourth transistor is connected to the first node;
a drain of the third transistor and a drain of the fourth transistor are connected to each other to configure a second node; and
a predetermined bias voltage is applied to a gate of the third transistor and a gate of the fourth transistor.

13. The receiver of claim 12, wherein the second amplifier comprises:
an isolation amplifier connected to the first amplifier and provided to block external noise while secondarily amplifying the firstly amplified signal; and
a current supplier including a fifth transistor provided between the power supply voltage and the isolation amplifier and configured to supply a current to the isolation amplifier.

14. The receiver of claim 13, wherein the isolation amplifier includes sixth to ninth transistors; and
the sixth transistor and the eighth transistor are connected in series between the current supplier and ground, the seventh transistor and the ninth transistor are connected in series between the current supplier and ground, and the sixth transistor and the eighth transistor are connected in parallel with the seventh transistor and the ninth transistor.

15. The receiver of claim 14, wherein a gate of the sixth transistor is connected to the second node, a drain of the sixth transistor and a drain of the eighth transistor are connected to each; and
a source of the sixth transistor and a source of the seventh transistor are connected to each other and are also connected to the drain of the fifth transistor, a drain of the seventh transistor and a drain of the ninth transistor are connected to each other to configure a third node;
a gate of the eighth transistor and a gate of the ninth transistor are connected to each other and a source of the eighth transistor and a source of the ninth transistor are respectively connected to ground; and
a gate of the eighth transistor is connected to the drain of the sixth transistor and the drain of the eighth transistor.

16. The receiver of claim 15, wherein a gate of the seventh transistor is connected to the output terminal of the buffer amplifier;
the voltage buffer includes a tenth transistor and an eleventh transistor connected in series between the power supply voltage and ground;
a gate of the tenth transistor is connected to the third node, and a drain of the tenth transistor is connected to the power supply voltage, and a source of the tenth transistor is connected to the output terminal of the buffer amplifier; and
a drain of the eleventh transistor is connected to a source of the tenth transistor, a source of the eleventh transistor is connected to ground, and a preset bias voltage is applied to a gate of the eleventh transistor.

17. An imaging system of terahertz band comprising:
a transmitter configured to transmit a terahertz band signal to a measurement target; and
a receiver configured to receive a signal reflected or transmitted from the measurement target, the receiver comprising:
  an antenna configured to receive the terahertz band signal reflected or transmitted from the measurement target;
  a detector configured to receive differential signals including a first input signal $V_{THz}$ and a second input signal $-V_{THz}$ with phase difference of 180° to each other from the antenna to detect a voltage, and operate in a concurrent mode; and
  a buffer amplifier configured to amplify and output a signal detected by the detector.

18. A detector mounted on a receiver of the terahertz band, wherein the detector is configured to receive differential signals including a first input signal and a second input signal with phase difference of 180° to each other from an antenna that receives a terahertz band signal, detect a voltage, and operate in a concurrent mode.

19. The detector of claim 18, wherein the detector comprises:
  a first CMOS of which a gate is connected to a first input terminal to which the first input signal $V_{THz}$ is input, a drain is connected to a first output terminal, and a source is connected to ground;
  a second CMOS of which a gate is connected to a second input terminal to which a second input signal $-V_{THz}$ is input, a drain is connected to a second output terminal, and a source is connected to ground;
  a first capacitor provided between the gate of the first CMOS and the second output terminal; and
  a second capacitor provided between the gate of the second CMOS and the first output terminal.

* * * * *